UNITED STATES PATENT OFFICE.

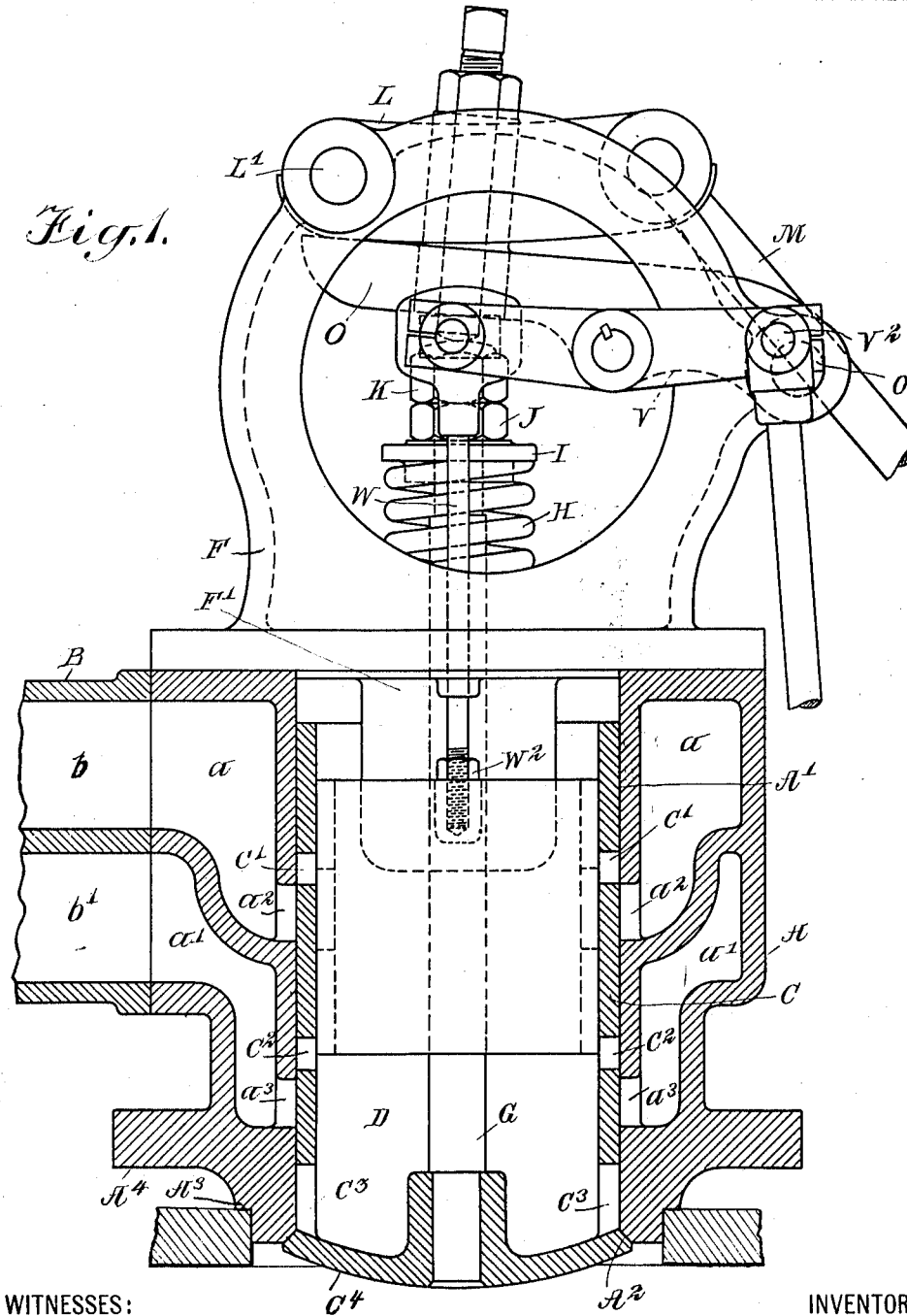

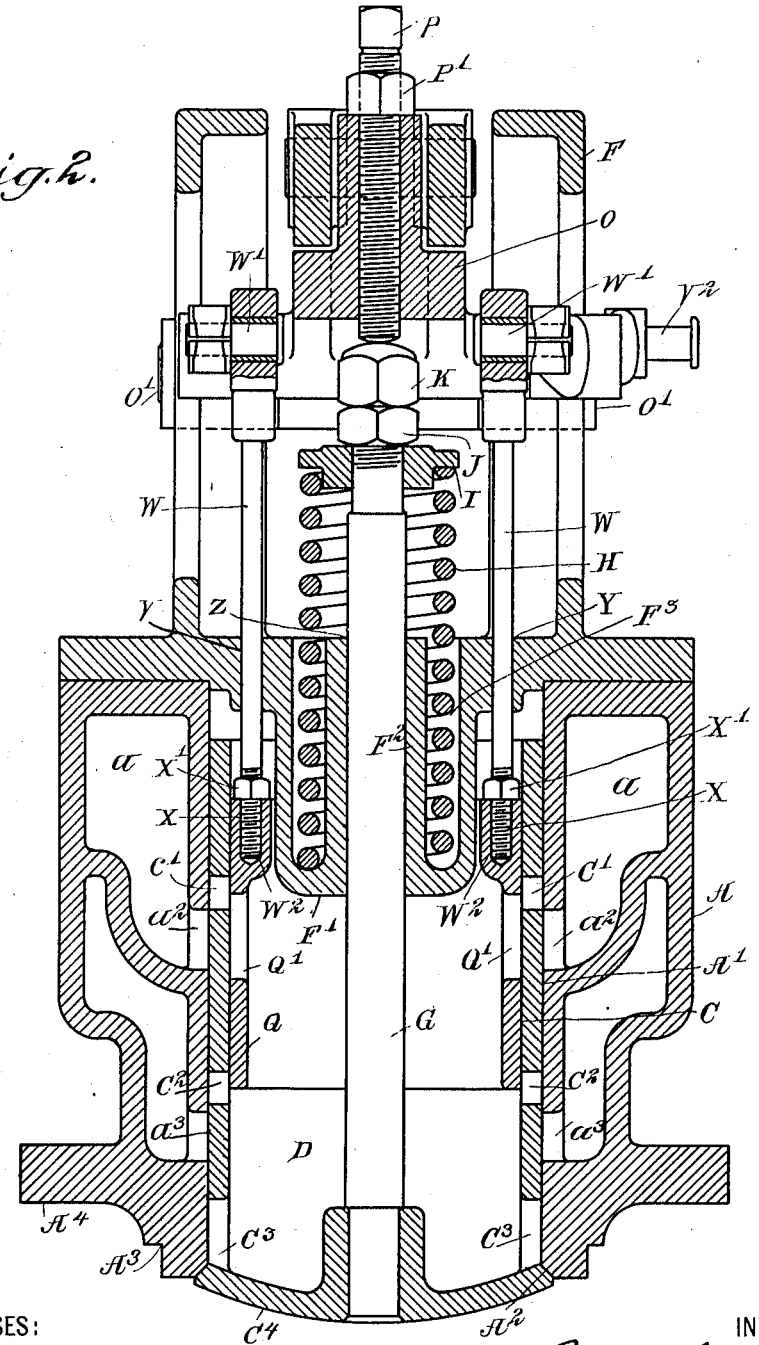

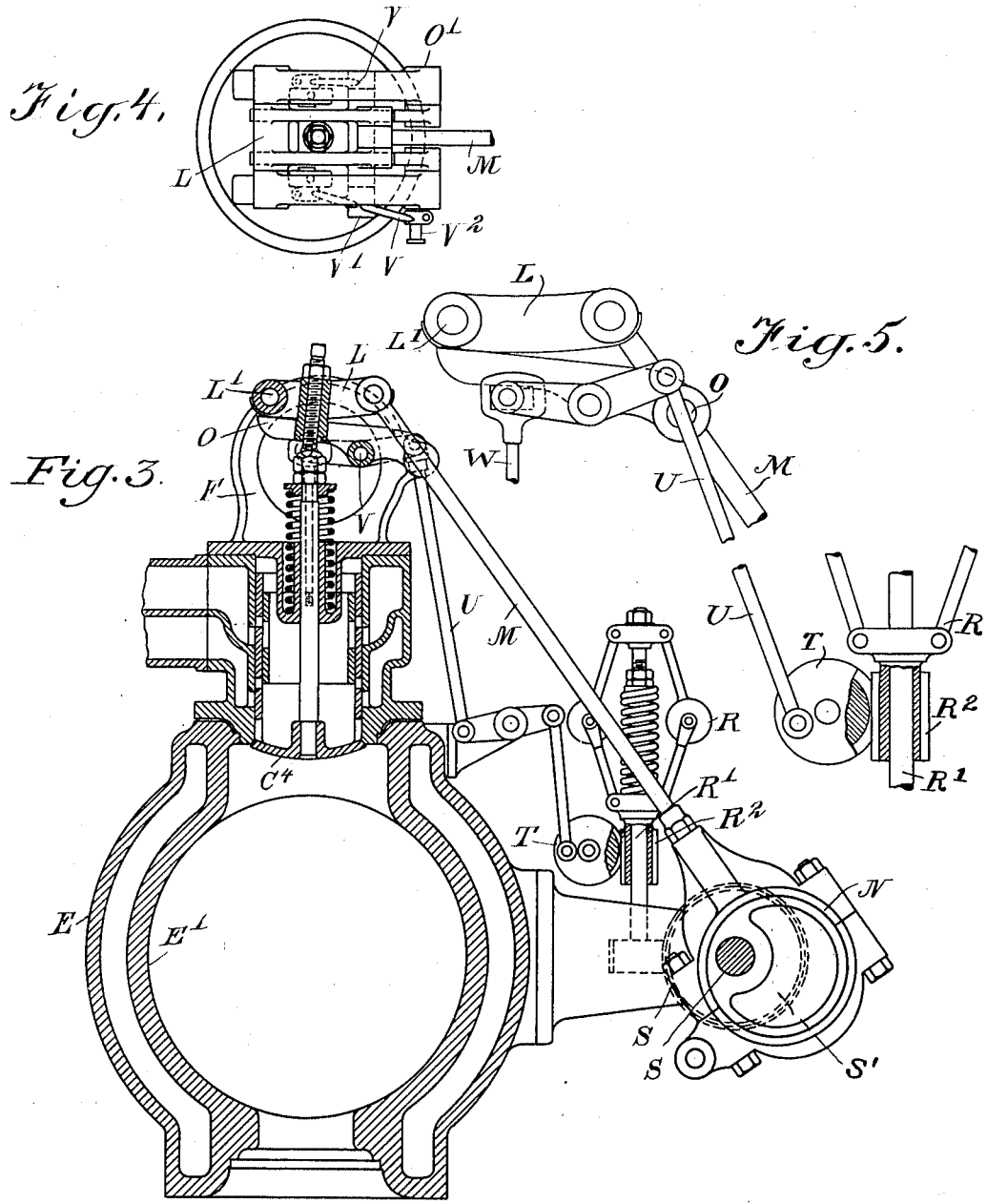

BAXTER M. ASLAKSON, OF SALEM, OHIO.

VALVE FOR GAS-ENGINES.

974,337.

Specification of Letters Patent.   Patented Nov. 1, 1910.

Application filed October 19, 1907.   Serial No. 398,155.

*To all whom it may concern:*

Be it known that I, BAXTER M. ASLAKSON, a citizen of the United States, and resident of Salem, in the county of Columbiana and State of Ohio, have invented certain new and useful Improvements in Valves for Gas-Engines, of which the following is a specification.

My invention relates to valves for engines and is especially adapted for gas engines.

The object of my invention is to provide an inlet valve of the character referred to, together with means for operating same, and the specification will set it forth as it is constructed for use in an engine of the four cycle type, although it may be utilized in connection with a two cycle engine if desired.

The invention consists in the novel construction described herein and pointed out in the claims, and comprises generally, a casing in which is located a main valve which controls both an air and a gas port located in said casing, the valve operating to open first the air port to supply air, and then the gas port to supply gas, so that the air and gas are admitted together to the engine cylinder to form the fuel charge.

My invention further comprises an automatic cut-off valve for the gas and air supply, and which is located within the main valve-casing, but this cut-off valve may be dispensed with in some cases where the gas is governed by other mechanism, and the engine still be operated with the main valve construction only.

In the accompanying drawings forming part of this specification,—Figure 1, is a view, partly in central vertical section, of a valve construction embodying my invention. Fig. 2, is a central vertical section of the said valve construction, at right angles to the plane represented in Fig. 1. Fig. 3, is a view showing on a somewhat smaller scale, the application of the valve and its operating means to a gas engine. Fig. 4, is a detail plan view of parts on the valve casing. Fig. 5, is a detail side view of certain parts of the valve operating means.

The main valve-casing A, is provided with two annular chambers $a$, and $a'$, communicating with the air and gas conduits $b$ and $b'$ respectively, in the casting B, which conduits lead respectively from the source of air and gas supply. In the case of a two cycle engine, the air and gas should be under pressure in the conduits $b$ and $b'$, and may be under pressure in the operation of the four cycle engine if desired, though not necessarily so. The casing A, is further provided with a central cylindrical bore A', in which is slidingly fitted, a cylindrical shell C, provided with ports C' and $C^2$, adapted to register with ports $a^2$ and $a^3$ respectively, in the casing to admit air and gas respectively, to chamber D within the valve shell C. Said shell C has a main-valve $C^4$, located at its lower end and formed integral therewith, which main-valve seats against the lower end of the casing A at $A^2$, thus presenting a single valve to effect closure between the interior of the engine cylinder, and the air and gas ports.

The casing A embodies a seat $A^3$, which is adapted to fit on the end of the cylinder casting E of the engine (see Fig. 3), and to which casting said casing is fastened by means of bolts which are passed through the casing flange $A^4$. Openings $C^3$ in the shell C serve as ports for the passage of the fuel charge from the chamber D to the interior E' of the engine cylinder, when the valve $C^4$ is open.

Mounted on the top of the casing A, and forming a closure for the chamber D, at this end, is a casting F, which is bolted to the top of the casing and forms a housing and frame for the support of the valve levers, and is provided with a hollow central projection F', in which is supported a vertical bearing guide $F^2$, for the rod G connected at its lower extremity to the valve $C^4$. An annular groove or recess $F^3$, in the projecting part F, serves as a pocket for the lower portion of a spring H, which portion abuts against the recess bottom, while said spring at its upper end abuts against a washer-nut I, by means of which the tension of the spring can be adjusted, said washer-nut being held in its adjusted position by a jam-nut J, which in turn is jammed by the cap-nut K, the said nuts being all screwed to the upper end of the valve-rod G, and the said spring serving to hold the main valve in its proper position.

L, designates a bifurcated cam lever which is pivoted at one end to the frame F, on a bearing-stud L', and at its opposite end to the upper end of rod M which is operated by an eccentric N, driven in timed relation with the engine. The cam lever L, rocks on the upper surface of the rocker arm O, pivoted to the frame F at O', the lever L, imparting to said rocker arm a movement of constant amplitude, which movement is transmitted to the valve-rod G through the bolt P which is adjustably mounted in the rocker arm directly above the end of said valve-rod, and which may be screwed up or down therein to effect the degree of opening of the valve $C^4$ and consequently of the ports C' and $C^2$.

It is obvious that the construction thus far described would be sufficient to operate in connection with an engine, regardless of means for automatically controlling the quantity of air and gas further than thus provided for, if the engine was to operate under a fairly constant load so that the admission of gas and air could be controlled by manually operated valves, but where a fluctuating load is to be incurred, I provide the automatic valve construction about to be described.

A hollow cylindrical valve Q is fitted to snugly slide within the shell C of the main valve $C^4$, the lower end of which valve Q may travel over the ports $C^2$ to limit the admission of gas to chamber D, said valve Q containing ports Q' which are adapted to register with the ports C' and the upper edges of which ports Q' are adapted to serve as a cut off for the air, if carried far enough relative to the ports C'. The time of movement of the valve Q relative to the valve $C^4$ and ports C' and $C^2$, is controlled by the governor R, which is driven by the layshaft S of the engine by means of a worm gear S' indicated by dotted lines, Fig. 3, and which rotates the shaft R' to drive the governor. The governor controls the vertical position of a worm gear which is splined to the shaft R' to revolve therewith, said gear $R^2$ driving the gear T which in turn operates to reciprocate rod U, the latter being connected to one end $V^2$ of a bell-crank lever V which is connected to the rocker arm at V'. The opposite end of the bell-crank lever V is connected to the rods W at W', and the lower ends of the rods W are connected to the valve Q at $W^2$. The throw of the eccentric N is such as to actuate the opening of the main valve $C^4$ a predetermined degree, and the gears $R^2$ and T are geared to actuate the bell-crank lever V to move in synchronism with the shell-casing C with the ports C' and $C^2$ open when the engine is working up to normal speed, but should the engine run faster than normal speed, the governor would force the gear sleeve $R^2$ into a lower position on the shaft R', thus advancing the movement of the gear T, which would lower the valve Q relative to shell C, at an earlier time thus cutting off the gases flowing through ports C' and $C^2$. The valves in Fig. 2, are shown in their normal position when the engine is working at the predetermined speed, or the normal speed of the engine. If the engine under heavy load should run below the normal speed, the cut off valve closes the ports in the main valve at a later period, thus allowing more fuel to flow into the cylinder.

It will be observed that the movement of the main valve in opening, will first cause ports C' and $a^2$ to open, thus first opening the admission of the air to the cylinder of the engine. This serves to prevent back firing by interposing a certain amount of air between the exhausting gases, and the new fuel charge. It will be also noted that the gas ports close first on the closing movement of the main valve, so that the chamber D will be swept free from all fuel by air which will occupy the chamber D when the fuel charge is ignited in the cylinder of the engine, so that an explosion of gas in the fuel conduits, due to any leak in the main valve, is impossible. This avoidance of explosion in the fuel conduits, I consider an important feature of my construction. It will also be noted that the air and gas are mechanically mixed as they flow together through the openings $C^3$, thus insuring complete combustion in the cylinder, and that by my means of governing, I am enabled to cut off the fuel mixture, and control the speed by the amount of the mixture admitted to the cylinder.

The valve Q may be set relative to the shell C by means of adjusting screws X held by lock nuts X', which latter can be easily reached by removing the housing F from casing A.

Having thus described my invention, what I claim as new and desire to secure by Letters Patent, is—

1. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve to close the said central chamber and having walls rigidly mounted on said valve to slide in contact with the walls of the central chamber and in the path of said port openings, so disposed that the port openings into the annular chamber connected with the gas supply are exposed later than are the port openings connected with the air supply; a throttle valve mounted within said valve comprising walls adapted to close the port openings in said valve; and suitable means for reciprocating the said valve in timed relation with the engine; and suitable speed actuated means to change the position of said throttle within said valve.

2. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a cylindrical valve slidably fitted in said casing and provided with port openings to expose the said port openings in the casing, said openings in the valve so disposed that the openings leading to the air supply are exposed not later than the opening to the explosion chamber, and that the openings leading to the gas supply are exposed later than the said opening to the explosion chamber; a throttle valve mounted within said valve comprising walls adapted to close the port openings in said valve; and suitable means for reciprocating the said valve in timed relation with the engine; and suitable speed actuated means to change the position of said throttle within said valve.

3. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a cylindrical valve slidably fitted in said casing and provided with port openings to expose the said port openings in the casing, said first mentioned openings being of smaller dimensions than later said mentioned openings in the casing, said openings in the valve being so disposed that the openings leading to the air supply are exposed not later than the opening to the explosion chamber, and that the openings leading to the gas supply are exposed later than the said opening to the explosion chamber; a throttle valve mounted within said valve comprising walls adapted to close the port openings in said valve; and suitable means for reciprocating the said valve in timed relation with the engine; and suitable speed actuated means to change the position of said throttle within said valve.

4. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a cylindrical valve slidably fitted in said casing and provided with port openings in the cylindrical walls to open into the explosion chamber of the engine and to expose said port openings in the casing, said openings in the valve so disposed that the openings in the casing leading to the air supply are exposed simultaneously with the opening of the port into the explosion chamber, and the openings in the casing leading to the gas supply are exposed later than the said opening to the explosion chamber; a throttle valve mounted within said valve comprising walls adapted to close the port openings in said valve; and suitable means for reciprocating the said valve in timed relation with the engine; and suitable speed actuated means to change the position of said throttle within said valve.

5. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve consisting in an inverted open-ended cylinder, slidably mounted in said central chamber, the cylindrical wall being provided with port openings of predetermined size to move in the path of the port openings in said central chamber, said port openings in the valve being disposed in closer relation than the ports in said casing whereby the ports to the air supply and the ports to the gas supply are exposed successively; a throttle valve mounted within said valve comprising walls adapted to close the port openings in said valve; and suitable means for reciprocating the said valve in timed relation with the engine; and suitable speed actuated means to change the position of said throttle within said valve.

6. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve consisting in an inverted cylinder slidably mounted in said central chamber, the walls of said cylinder being perforated to provide ports of predetermined size to expose openings in said chamber and to open into the explosion chamber of the engine, the said ports in the valve being smaller than the ports in the central chamber, and the ports leading into the explosion chamber being of an area equal to at least the combined area of the ports leading to the air and gas supply; a throttle valve mounted within said valve comprising walls adapted to close the port openings in said valve; and suitable means for reciprocating the said valve in timed relation with the engine; and suitable speed actuated means to change the position of said throttle within said valve.

7. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve consisting in an inverted cylinder slidably mounted in said central chamber, the walls of said cylinder being perforated to provide ports of predetermined size to expose the port openings in said chamber and to open into the explosion chamber of the engine, the said ports in the valve being smaller than the ports in the central chamber, and so disposed that the openings leading to the air supply are exposed in advance of the exposure of the openings leading to the gas supply; a throttle valve mounted within said valve comprising walls adapted to close the port openings in said valve; and suitable means for reciprocating the said valve in timed relation with the engine; and suitable speed actuated means to change the position of said throttle within said valve.

8. A valve for gas engines comprising; a cylindrical casing opening into the explosion chamber of the engine embodying a central chamber and annularly disposed chambers in communication with the air supply and gas supply respectively; and having port openings leading from the annular chambers to the central chamber; a cylindrical valve slidably fitted in said casing and provided with port openings to expose the said port openings in the casing, said openings in the valve so disposed that the openings leading to the air supply are exposed not later than the opening to the explosion chamber, and that the openings leading to the gas supply are exposed later than the said opening to the explosion chamber; a throttle valve consisting in a cylinder slidably mounted in said valve and adapted to move in unison with said valve and adapted to close the port openings in said valve; and suitable means for reciprocating the said valve in timed relation with the engine; and suitable speed actuated means to change the position of said throttle within said valve.

9. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a cylindrical valve slidably fitted in said casing and provided with port openings in the cylindrical walls to open into the explosion chamber of the engine and expose said port openings in the casing, said openings in the valve so disposed that the openings in the casing leading to the air supply are exposed simultaneously with the opening of the port into the explosion chamber, and the openings in the casing leading to the gas supply are exposed later than the said opening in the explosion chamber; a cylindrical valve slidably fitted in said casing and provided with port openings to expose the said port openings in the casing first mentioned opening being of smaller dimensions than the said later mentioned openings in the casing, said openings in the valve being so disposed that the openings leading to the air supply are exposed not later than the opening to the explosion chamber, and that the openings leading to the gas supply are exposed later than said opening to the explosion chamber; a throttle valve consisting in a cylinder slidably mounted in said valve and adapted to move in unison with said valve and adapted to close the port openings in said valve; and suitable means for reciprocating the said valve in timed relation with the engine; and suitable speed actuated means to change the position of said throttle within said valve.

10. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a cylindrical valve slidably fitted in said casing and provided with port openings in the cylindrical walls to open into the explosion chamber of the engine, and to expose said port openings in the casing, said openings in the valve so disposed that the openings in the casing leading to the air supply are exposed simultaneously with the opening of the port into the explosion chamber, and the openings in the casing leading to the gas supply are exposed later than the said opening to the explosion chamber; a throttle valve consisting in a cylinder slidably mounted in said valve and adapted to move in unison with said valve and adapted to close the port openings in said valve; and suitable means for reciprocating the said valve in timed relation with the engine; and suitable speed actuated means to change the position of said throttle within said valve.

11. A valve for gas engines comprising; a cylindrical casing opening into the explosion chamber of the engine embodying a central chamber and annularly disposed chambers in communication with the air supply and gas supply respectively, but having port openings leading from the annular chambers to the central chamber; a valve consisting in an inverted open ended cylinder slidably mounted in said central chamber, the cylindrical wall being provided with port openings of predetermined size to move in the path of the port openings in said central chamber, said port openings in the valve being disposed in closer relation than the ports in said casing whereby the ports to the air supply and the ports to the gas supply are exposed successively; a throttle valve consisting in a cylinder slidably mounted in said valve and adapted to move in unison with said valve and adapted to close the port openings in said valve; and suitable means for reciprocating the said valve in timed relation with the engine; and suitable speed actuated means to change the position of said throttle within said valve.

12. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve consisting in an inverted cylinder slidably mounted in said central chamber, the walls of said cylinder being perforated to provide ports of predetermined size to expose the port openings in said chamber and to open into the explosion chamber of the engine, the said ports in the valve being smaller than the ports in the central chamber, and the ports leading into the explosion chamber being of an area equal to at least the combined area of the ports leading to the gas and air supply; a throttle valve consisting in a cylinder slidably mounted in said valve and adapted to move in unison with said valve and adapted to close the port openings in said valve; and suitable means for reciprocating the said valve in timed relation with the engine; and suitable speed actuated means to change the position of said throttle within said valve.

13. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve consisting in an inverted cylinder slidably mounted in said central chamber; the walls of said cylinder being perforated to provide ports of predetermined size to expose the port openings in said chamber and to open into the explosion chamber of the engine, and said ports in the valve being smaller than the ports in the central chamber, and so disposed that the openings leading to the air supply are exposed in advance of the exposure of the openings leading to the gas supply; a throttle valve consisting in a cylinder slidably mounted in said valve and adapted to move in unison with said valve and adapted to close the port openings in said valve; and suitable means for reciprocating the said valve in timed relation with the engine; and suitable speed actuated means to change the position of said throttle within said valve.

14. A valve for gas engines comprising; a cylindrical casing opening into the explosion chamber of the engine embodying a central chamber and annularly disposed chambers in communication with the air supply and gas supply respectively, and having port openings leading from the annular chambers to the central chamber; a valve to close the said central chamber and having walls rigidly mounted on said valve to slide in contact with the wall of the central chamber and in the path of said port openings, so disposed that the port openings into the annular chamber connected with the gas supply are exposed later than are the port openings connected with the air supply; a throttle valve mounted within said valve comprising walls adapted to close the port openings in said valve; a rocking member connected to the said valve and to the lay shaft of the engine to reciprocate the said valve and comprising a suitable device to change the position of the said valve in the said chamber; a rocking member connected to the said throttle valve and to the lay shaft of the engine to reciprocate the said throttle valve and a suitable device to change the position of the said valves relative to each other.

15. A valve for gas engines comprising; a cylinder opening direct to the explosion chamber of the engine, and disposed to receive both air and gas supply and having ports therefor; a spring actuated puppet valve to close the passage from said cylinder to the explosion chamber of the engine having rigidly attached thereto a slide valve to close the ports leading from the gas supply, said slide valve so placed that the port is exposed after the passage to the explosion chamber is opened; a lever to operate the said puppet and slide valves to open the passage to the explosion chamber of the engine in timed relation to the operation of the engine and through the connection of the said valves with an eccentric mounted upon a lay-shaft.

16. A valve for gas engines comprising; a cylinder opening direct to the explosion chamber of the engine and disposed to receive both air and gas supply and having ports therefor; a spring actuated puppet valve to close the passage from said cylinder to the explosion chamber of the engine having integrally formed therewith a slide valve to close the ports leading to the gas supply in advance of the seating of the said puppet valve; a lever to operate the said puppet and slide valves to open the passage to the explosion chamber of the engine in timed relation to the operation of the engine and through the connection of the said valves with an eccentric mounted upon a lay-shaft.

17. A valve for gas engines comprising; a one piece member having a circular, vertical, central opening and horizontally divided to form two separate annular chambers when the said central opening is filled, said chambers adapted to receive the air and gas supply separated; a one piece member adapted to fit within the said central opening and having a cylindrical inner chamber to open directly into the explosion chamber of the engine, and ports to communicate between the said inner chamber and the said annular chamber, said member being provided with a valve seat at its open end opening into said explosion chamber; a spring actuated puppet valve to close said inner cylindrical chamber having a valve stem mounted in guides in the said member forming the cylindrical chamber, and further having rigidly connected a slide valve to slide on the inner surface of the cylindrical chamber to close the gas inlet ports in advance of the seating of the said puppet valve; a throttle valve to slide within said slide valve to control the opening of the gas chamber port; a yoke attached to the said throttle valve passed out of said cylindrical chamber; a rocking member to engage the said yoke to reciprocate the throttle valve, said rocking member connected with the governor of the engine to be moved thereby; a lever to operate the said puppet and slide valves to open the passage to the explosion chamber of the engine in timed relation to the operation of the engine and through the connection of the said valves with an eccentric mounted upon a lay-shaft.

Signed at Salem in the county of Columbiana and State of Ohio this eighth day of October A. D. 1907.

BAXTER M. ASLAKSON.

Witnesses:
FRANK M. ASHLEY,
W. G. HARD.